Sept. 25, 1956    N. G. H. LINDHOLM ET AL    2,764,019
VIBRATION MEASURING DEVICE
Filed March 3, 1954
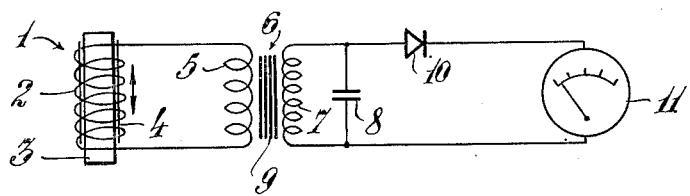
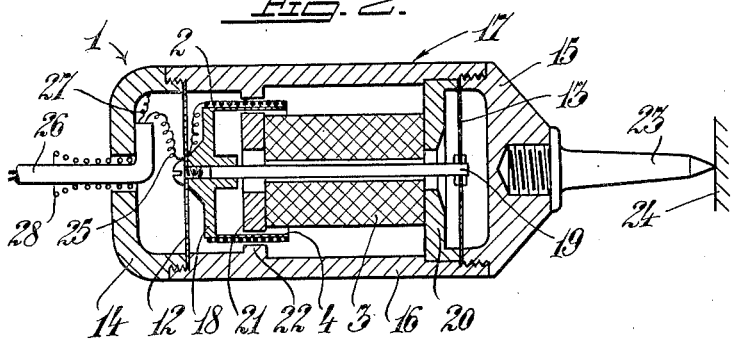
INVENTORS:
NILS GÖSTA HJALMAR LINDHOLM
and STIG OLOV JUSELIUS,
By
Their Agent.

United States Patent Office 2,764,019
Patented Sept. 25, 1956

2,764,019
VIBRATION MEASURING DEVICE

Nils Gosta Hjalmar Lindholm and Stig Olov Juselius, Finspang, Sweden

Application March 3, 1954, Serial No. 413,862

Claims priority, application Sweden March 19, 1953

3 Claims. (Cl. 73—71.2)

Methods are known for measuring the amplitudes of mechanical vibration by transforming the mechanical vibration energy into electrical energy and then amplifying and measuring an electrical factor related to the amplitude. The energy transforming element in systems according to said principle may be of an electromechanical type including a coil seismically arranged in a magnetic field. The damping of the natural oscillation may be performed either in an electrical way or by means of a liquid.

The alternating voltage generated in the coil, said voltage being i. e. a function of the frequency of the vibration, may be transformed to a voltage which corresponds to the vibration amplitude only. Owing to the energy losses arising in the integration and due to other reasons, the alternating voltage obtained must be amplified electronically and then it may be measured, which usually is carried out with the aid of a cathode ray oscillograph.

The main object of this invention is to provide a new and improved system for measuring vibration amplitudes with the aid of a mechanical vibration transducer including a seismically arranged coil system and in connection thereto a measuring instrument and integrating means having such properties that the entire measurement may be carried out without using any amplifier or additional energy. Thus the measurement may be performed by using the vibration energy only. An apparatus according to this invention is not line supplied and does not include any element which may be subject to run down, such as an electron valve, batteries or the like.

Another object of the invention is to provide a system for measuring vibration amplitudes which makes it possible to obtain at low cost a measuring device having small dimensions, low weight, great reliability of service, increased accuracy of measurement and is easy to handle. This makes the system very useful for a great number of measuring purposes, partly within application domains new for vibration meters. As an example thereof, continuous vibration supervision of machines may be mentioned by which it is important that no interruption of the measurement and no changes in the accuracy of measurement occurs during a very long measuring period.

Due to the fact that the main object of the invention consists in providing a vibration measuring system, using only the vibration energy for the measurement, the vibration transducer and the pointer instrument system must be arranged in different ways in order to meet said object. Besides the above mentioned conditions the dimensions of the transducer must be small and its weight must be low in order that it should not influence the measured object, and at the same time very small vibration amplitudes may be measured within a maximum frequency range. For these reasons, the electrical energy generated in the transducer will be very small. However, by the particular combined measures taken in the system according to this invention as hereinafter described it has proved possible to perform amplitude measurements while using only the vibration energy. According to said system the transducer includes a permanent magnet and a coil unit adapted to oscillate in a single air gap of the magnet thereby inducing a current in the coil of said unit. In order to damp the oscillation of the coil unit, the coil form is made of non-magnetic electrically conducting material, whereby the damping effect is obtained by eddy currents generated in the coil form. The damping effect is adjusted to let as little energy as possible be consumed during integration. The voltage induced in the coil is transformed, integrated and rectified in a voltage transformer, a capacitor connected in parallel with the output of said transformer and rectifying means to a direct voltage of sufficient magnitude to be measured by an electrical moving coil instrument. Due to this arrangement, a vibration transducer is obtained having a very low weight and permitting a direct reading of the amplitude on a pointer instrument even at small vibration amplitudes, without using any additional energy source other than the vibration itself.

The invention is illustrated in the drawing, in which Fig. 1 is an electric circuit diagram and Fig. 2 is a sectional view of a vibration transducer or pick up of seismic type.

Referring now to Fig. 1 a vibration transducer is generally designated by 1, said transducer including a coil 2 surrounding a permanent magnet 3 and suspended to oscillate with relation thereto, when the transducer is subjected to the vibration to be measured. The coil 2 is wound on a coil form 4 of non-magnetic electrically conducting material adapted to damp the oscillation of the coil unit by aid of eddy currents generated in said form. The device is so constructed, by a suitable selection of the size of the wall of the coil form 4 and its material, that the damping is given such a value that for each amplitude a substantially constant output is obtained from the coil 2 irrespective of the frequency. Said coil 2 is connected to the primary winding 5 of a voltage step up transformer, generally designated by 6. The secondary winding 7 of the voltage transformer 6 is connected in parallel with a condenser 8 to effect an integration of the voltage simultaneously with the transforming. In order to obtain a high transforming efficiency, the core 9 of the voltage transformer 6 may be laminated, and be made of a material of high permeability.

The alternating voltage is rectified in a rectifier 10 of the crystal diode type, for instance comprising one or more germanium or silicon crystal diodes in order to obtain the highest possible rectifying effect at low voltages. The direct voltage obtained is fed to a pointer instrument 11 of the moving-coil type.

The above mentioned transducer 1 is shown in detail in Fig. 2. As apparent from Fig. 2 the coil unit 2, 4 is seismically suspended in a pair of axially spaced diaphragm springs 12 and 13 clamped at their peripheries between the respective end portions 14, 15 and an intermediate portion 16 of a casing generally designated by 17. The coil form 4 is formed with a disk 18 which is secured with its centre to the centre of the diaphragm spring 12, and a rod 19 rigidly connects the centres of the diaphragm springs 12 and 13. An annular disk 20 is secured between the front end portion 15 and the intermediate portion 16 of the casing 17, and said disk 20 rigidly supports the permanent magnet 3. The magnet 3 is apertured to receive freely said rod 19, which connects the diaphragm springs 12, 13. The opposite end of the permanent magnet 3 supports a washer 21 that forms, in cooperation with an inner peripheral ring 22 on the intermediate portion 16 of the casing 17, a narrow annular air gap for receiving the coil unit 2, 4. It is to be noted that this is the only air gap in the transducer. The permanent magnet is a cylinder type magnet, or a bar type magnet, having a hole therein. The portion 16, the disk 20 and the washer 21 are all composed of magnetic material and define the flux path.

The front end portion 15 of the casing 17 is provided with a tip 23 adapted to be held against the vibrating object 24, thereby transmitting the vibrations to the casing 17 and the elements rigidly connected thereto such as the permanent magnet 3 and effecting a relative oscillation between the coil unit 2, 4 and said permanent magnet 3.

One end of the coil 2 is grounded to the coil form and the other end is connected to one wire 25 of a two-wire conductor 26 having its other wire 27 grounded to the metal casing 17. The two-wire conductor 26 is provided with a protecting coil spring 28 at the passage through the rear end portion 14.

It is to be noted that the coil form 4 and the rod 19 connecting the diaphragm springs 12, 13 substantially make up the mass, which in connection with the diaphragm springs 12, 13 determines the natural frequency of the movable system. Due to the fact that only one gap is used for the magnetic flux the highest possible output is obtained from the transducer while using as small a magnetic mass as possible.

The amount of the electric damping is of great importance for the possibility of measuring vibration amplitudes according to this invention. If the damping effect is small it is impossible to integrate the alternating current owing to the predominating influence of the natural frequency on the characteristic of the output from the transducer. If the damping is too great, too much power will be consumed for the integration and a reading will not be obtained in the instrument 11. The damping should be so, owing to the structural dimensions selected, as explained before, that a certain increased output is obtained in the frequency range close to the natural frequency of the coil unit, which is counteracted by a decrease in the efficiency at low frequency of several of the remaining electrical elements, and at the same time a minimum of energy will be consumed when integrating at higher frequencies.

What we claim is:

1. A self-contained vibration powered seismic pickup and vibration meter, comprising a casing arranged to receive vibrations, a permanent magnet secured on the interior of said casing and vibratable therewith, a unit seismically suspended relative to said magnet and including a coil and a coil form, whereby upon vibration of said casing the vibrating field of said permanent magnet will induce alternating voltages in said coil, said coil form being adapted to produce a damping effect by eddy currents generated by the field of said vibrating magnet damping the relative oscillation movement between said magnet and said unit, and an integrating and rectifying circuit connected to said coil and including a voltage transformer having its input in series with said coil, a capacitor in parallel with the output of the transformer, and a rectifier of the crystal diode type in series with said output, and operable to give a direct output voltage of said alternating voltages induced by said damped relative oscillation movement between said magnet and said unit dependent on the amplitude of the vibrations but substantially independent of the frequency thereof, and a moving-coil instrument connected to said circuit in series with said rectifier indicating said direct voltage.

2. A system for measuring amplitudes of mechanical vibrations using for the measurement only the energy generated by said vibrations, comprising in combination, an electro-magnetic transducer including a casing arranged to receive vibrations, a permanent magnet having one pole secured on the interior of said casing and vibratable therewith, said permanent magnet having its other pole spaced from said casing defining an air gap between said other pole and the casing, a coil unit extending through said air gap, flexible means for seismically suspending said coil unit in said casing for allowing it to move axially in said air gap, said coil unit including a coil and a coil form of non-magnetic electrically conducting material, whereby upon vibration of said casing the vibrating field of said permanent magnet will induce alternating currents in said coil, and said coil form being adapted to produce a damping effect by eddy currents generated by the field of said vibrating magnet damping the relative oscillation movement between said unit and said magnet and reducing the value of the induced alternating voltages, means electrically connected to said coil for integrating and rectifying the alternating voltage values induced by the damped relative oscillation movement, and arranged to give a direct voltage output dependent on the amplitude of the vibrations but substantially independent of the frequency, and comprising a voltage transformer having its input connected in series with said coil, a capacitor connected in parallel with the output of said transformer, and a rectifier of the crystal diode type connected in series with said output, and a moving-coil instrument electrically connected in series with said rectifier for indicating said direct voltage.

3. In a system as claimed in claim 2, said seismically suspended coil unit including two spaced diaphragm springs secured to said casing, a rod rigidly connecting said diaphragm springs, said rod coaxially supporting said coil and coil form.

References Cited in the file of this patent

UNITED STATES PATENTS

| 2,002,372 | Greentree et al. | May 21, 1935 |
| 2,251,436 | Bentley et al. | Aug. 5, 1941 |
| 2,533,249 | Henson | Dec. 12, 1950 |

OTHER REFERENCES

Introduction to a Study of Mechanical Vibration, G. W. Van Stanten, Elsevier Press Inc. 402 Lovett Blvd. Houston 6, Tex., pp. 228, 229, 245 and 246.